March 4, 1969 W. I. BARNES 3,430,613
CHROME-PLATED METERING VALVE
Filed June 26, 1967

INVENTOR.
William I. Barnes,
BY Parker & Carter
Attorneys.

United States Patent Office 3,430,613
Patented Mar. 4, 1969

3,430,613
CHROME-PLATED METERING VALVE
William I. Barnes, Birmingham, Mich., assignor to Standard Screw Company, Bellwood, Ill., a corporation of New Jersey
Filed June 26, 1967, Ser. No. 648,857
U.S. Cl. 123—90
Int. Cl. F01l *1/22;* F16k *15/00*
5 Claims

ABSTRACT OF THE DISCLOSURE

The device disclosed comprises a hollow hydraulic tappet, to the interior of which lubricant is conducted from the engine in which the tappet is positioned. Lubricant fluid is discharged from the hydraulic tappet toward the valve operating means and furnishes lubrication to the valve operating means including the rocker arm and associated parts. The tappet disclosed is associated with a hollow pushrod which leads to the rocker arm which moves an engine valve. Means are provided in the tappet to meter the flow of lubricant to the pushrod. This means comprises a generally flat chrome plated disk provided on one face or on each face with a ring-like raised portion which is shaped with a gap or open space in the ring. The ends of the ring are separated. A seat for the disk is provided within the tappet about the opening through which lubricant flows to the pushrod. When the disk is seated on the seat, lubricant can flow outwardly to the pushrod only through the gap between the ends of the ring and it is metered by the size of the gap between the ends of the ring. In usual practice, the disk is chrome plated on both faces irrespective of the precise disposition of the rings.

---

This invention relates to improvements in hydraulic tappets. It has for one object to provide in a hydraulic tappet means for metering the flow of fluid in the direction of the pushrod.

It has for another object to provide such metering means which will have long life and will avoid to a high degree the accumulation of sludge or any other deposit upon the metering disk.

Other objects and advantages will appear from time to time in the following description and claims.

Figure 1:
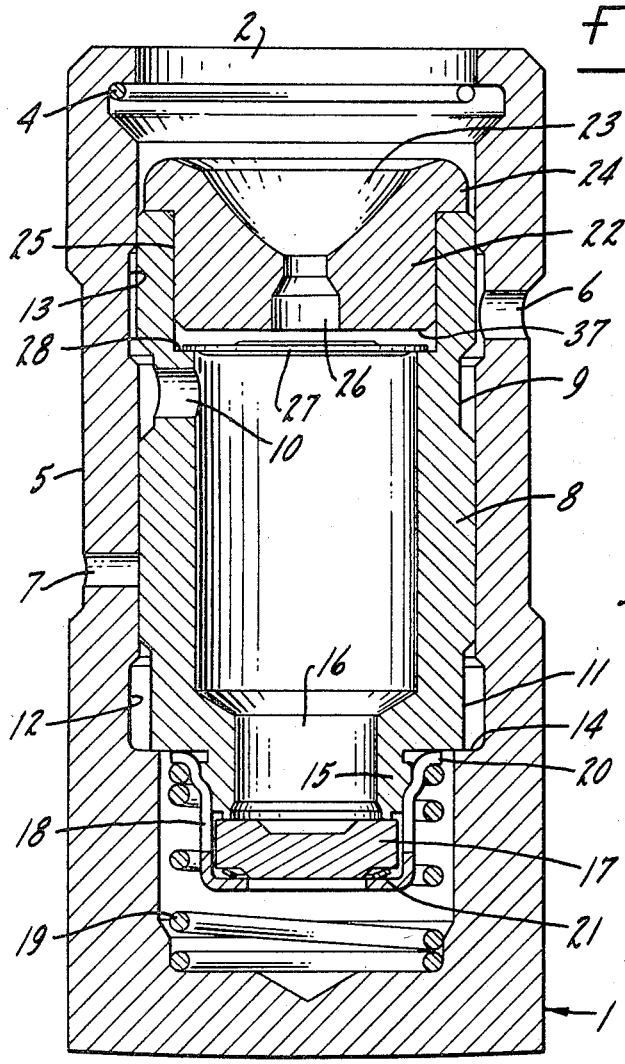
Figure 3:
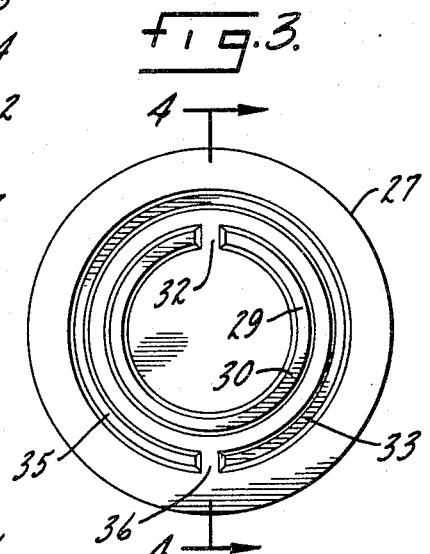
Figure 4:
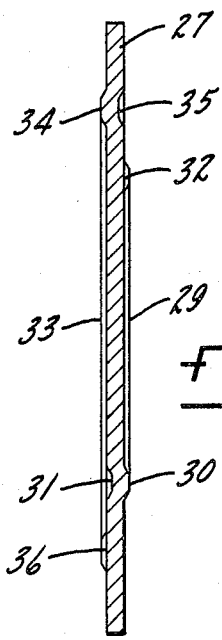
Figure 2:
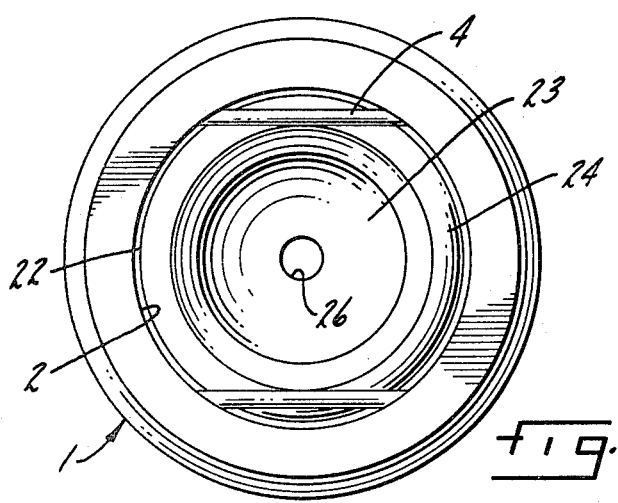

The invention is illustrated more or less diagrammatically in the following drawings wherein:

FIGURE 1 is a longitudinal section of a hydraulic tappet illustrating the metering means, FIGURE 2 is an end elevation of the tappet of FIGURE 1, FIGURE 3 is a plan view of one form of metering member on an enlarged scale, and FIGURE 4 is a transverse section taken at line 4—4 of FIGURE 3 on a further enlarged scale.

The device in the particular form herewith illustrated comprises a cylinder 1 having an open end 2 grooved inwardly to receive a snap ring 4 to retain a plunger within the cylinder. The cylinder is provided externally with an oil groove 5 and with an oil supply passage 6 from within its wall and within the area defined by the oil groove. The cylinder is also provided with a port or passage 7 which may connect the interior of the cylinder with the oil groove 5.

Positioned within the cylinder for reciprocation therein is a plunger 8 which is provided on its exterior with an oil groove 9. A perforation 10 connects the interior of the plunger 8 with the oil groove 9 and provides a passageway for the passage of oil into the plunger. The plunger is reduced exteriorly as at 11. The bore of the cylinder may be enlarged if desired intermediate its ends, as at 12, and it may also be enlarged toward its open end, as at 13. A shoulder 14 may be provided within the cylinder to limit the inward movement of the plunger.

The plunger is reduced to a necklike proportion 15 adjacent its inner end and an opening 16 is formed in this reduced portion. A valve 17 is positioned adjacent the open end 16 and is held against separation from the plunger by a retainer 18 which fits about the reduced portion 15 and is retained therein. The cage or retainer 18 is shaped to permit movement of the valve 17 toward or away from the plunger but to prevent its total separation therefrom.

A spring 19 bears at one end against the closed end of the cylinder 1 and at the other end against the shoulder 20 formed by the lip portion of the retainer 18.

A spring may, if desired, be positioned in contact with the valve 17 and also in contact with the inwardly turned flange of the retainer. In some cases, the spring 21 will be omitted.

In its open end, the plunger 8 receives a cuplike member 22 which has a generally rounded and more or less hemispherical cavity 23 in its open end. The member 22 has a shouldered portion 24 which limits the movement of its reduced portion into the plunger. A perforation or passage 26 is formed in the member 22 and provides an oil passage communicating with the interior of the plunger.

A metering disc 27 is positioned within the space defined by the inner end of the portion 25 of the cup member and the shoulder 28 formed in the plunger 8. The space defined between these members is sufficiently large to permit reciprocation of the metering disc 27. The diameter of the disc is less than the diameter of the space within which it is positioned. Thus, clearance for the flow of oil is provided about the edge of the metering disc.

The metering disc is shown in FIGURES 3 and 4 separately from the tappet assembly on an enlarged scale. As there shown, the disc comprises generally a disc member having a circular plan. On each face of the disc, there is formed a C ring. As shown particularly in FIGURE 3, these rings face oppositely and each provides a raised portion or land and a depressed or groovelike portion.

As shown particularly in FIGURE 4, the inner C ring 29 is shaped to provide a generally flat area 30 and a groovelike portion 31. An opening 32 is formed in the C ring. The outer or larger C ring 33 is formed on the opposite face of the disc 27 and it includes a raised portion or land 34, a grooved or hollow portion 35 and an opening 36 between its adjacent ends.

Thus, each of the C rings provides a raised land 30 or 34 and these lands are positioned on opposite faces of the disc making it impossible to assemble the metering disc in an improper position. However it may be installed into the tappet in the position shown in FIGURE 1, one of the C rings will face the inner surface of the cup member 22. Since each of the C rings is of greater diameter than the innermost end of the passage 26, the disc, when either of its C rings is seated against the surface 37, will meter the flow of oil from the interior of the plunger to the pushrod receiving depression 23. The notches or openings 32 and 36 have the same area in each case. Hence, whichever face of the disc 27 is opposed to the surface 37, a metering opening of the same capacity will be created by the seating of the raised lands 30 or 34 upon the plane surface 37 of the cup member 22. Obviously, only one of the C rings is effective at a time. The one which faces the interior of the plunger chamber has no metering effect. It is only the one which faces the cup member 22 and can be seated upon it which has any metering effect.

The sole purpose of the provision of two oppositely facing C rings or grooves upon a single disc is to make sure that one C ring or groove will always be in suitable position for metering when brought into contact with the mating face of the cup member irrespective of the manner of assembly of the metering disc in the suitable cavity within the plunger assembly.

While a double C ring construction has been shown, it is possible to construct the valve disk with a single C ring. It is also possible to make further changes in the form and shape both of the disc 27 and of the seat 37 against which it seats. The invention is therefore not limited to any particular form of disc or seat as long as there is a disc and a seat against which it is seated when pressure conditions within the plunger 8 cause it to move from the shoulder 28 into contact with the seat 37. The disc is chrome plated in whatever form it may be embodied.

The invention as shown will involve a disc which is chrome plated. The tappet itself is preferably made of a cast iron barrel and the plunger may be chrome plated on its exterior. The cup 22 upon the lower face of which the seat 37 is formed, will not normally be chrome plated.

Experience has shown that sludge, silt, varnish and other foreign materials tend to adhere upon a metering valve of the type disclosed and this will occur more readily upon a relatively rough surface than upon a smooth surface. The rough surface obviously gives more exposed area upon which such foreign matter may adhere. Experience has shown that the accumulation of sludge and other foreign matter upon a smooth chrome plated surface is far less than in the case of a disc which is formed, for example, of spring steel and which is not plated. The improved surface finish of the disc which is accomplished by chrome plating it prevents to a very large degree the deposition and accumulation of sludge, silt, varnish and other foreign matter.

Chromium is recognized for its resistance to corrosion. It is, however, not this feature that is primarily of advantage in preventing accumulation of foreign matter upon the metering disc. In as far as chromium resists corrosion or oxidation of the disc, it resists roughening of the disc surface and hence indirectly, it resists the accumulation of undesired material upon the disc.

The chrome plating on the surface of the basic material of which the disc is formed creates a hardened surface on the disc. There are inevitably present in lubricant oils some minute particles of abrasive material and in passing through the tappet, these will be forced to flow across the surface of the valve and finally through the metering orifice. They would have an abrasive action upon the metering disc and all of its parts and would tend to collect upon the disc were it not chrome plated.

The seating surface 37 is preferably of hardened ferrous material and is relatively flat and smooth. The relative rotation of the disc with respect to the valve seat tends to wipe the contact surface of the valve seat to keep it clean.

It is important to realize that the metering orifice created or formed by the gap in the raised C portions, when in contact with the bottom of the surface 37 of the plunger cup, is relatively a very small opening. In practice, it frequently amounts to an area of only approximately a .010 inch diameter hole and an orifice of this size can readily become wholely or partly plugged by sludge, silt, varnish or any other accumulation of material. This possibility of plugging is particularly likely in the event that relatively large particles of foreign material try to pass through the metering opening. Since the relatively small orifice is free to move in two directions, it can allow a relatively large piece of contaminate to pass through the orifice by momentarily moving the valve away from the seat. Also, due to the restriction created by the orifice, there is a considerable pressure drop across the orifice and relatively high velocity of fluid flow through the orifice which tends to help keep the orifice clean. The likelihood of the orifice plugging up is greatly reduced by the chrome plating which prevents the accumulation of foreign matter upon the disk and which prevents corrosion and in general prevents the adherence of contaminants to the disc.

The use, operation and function of the invention are as follows:

During the operation of this tappet, oil moves continuously from the chamber within the plunger to the cuplike portion of the member 22 to reach the end of the pushrod which is positioned within the cup and to move through the pushrod to lubricate the rocker arm and associated parts. It is generally preferable to meter the oil passing into the cup from the plunger and this is accomplished by the use of the metering disc 27 which is mounted to move into contact and out of contact with respect to the face 37 of the cup member 22. It is moved by pressure within the chamber formed inside of the plunger. When pressure conditions within the plunger move the disc 27 to seat one or the other of the C rings 29 or 33 upon the surface 37, oil can pass into the passage 26 only by first passing through the opening 32 or 36 of the respective C ring 33 or 35, whichever may be in contact with the surface 37.

As shown in FIGURE 1, the disc is in the position which it occupies when the engine is not in operation. During engine operation, oil under pressure comes through the passage 10 and seats the disk 27 against the inner face of the member 37. With the disk in the seated position, liquid may flow through the passage 26 through the opening 32 or 36 of the lands 33 or 35, whichever is seated at 37. Since the openings 32 and 36 are identical in size, the amount of oil passed to the passage 26 is the same whichever of the lands 33 or 35 is seated.

In general, the operation of the tappet, except for respect to the chrome plated metering disc, is that typical of hydraulic tappets.

Whereas the preferred form of the invention has been shown and described herein, it should be realized that there are many modifications, substitutions and alterations thereto within the scope of the appended claims. In particular, either the seating surface 37 or the valve disc 27 or both of them may be chrome plated.

I claim:
1. In combination in a hydraulic valve lifter,
   a barrel and a plunger mounted therein for reciprocation,
   a pushrod receiving member in said plunger,
   a lubricant passage through the wall of said barrel and through the wall of said plunger and through said pushrod receiving member, and
   means for controlling the flow of fluid through said last mentioned passage,
   said means comprising a valve seat about said passage and a relative flat valve disc mounted adjacent said valve seat,
   said valve seat being formed of hardened ferrous material and said disk being chrome plated throughout.
2. In combination in a hydraulic valve lifter,
   a barrel and a plunger mounted therein for reciprocation,
   a pushrod receiving member in said plunger,
   a lubricant passage through the wall of said barrel and through the wall of said plunger and through said pushrod receiving member, and
   means for controlling the flow of fluid through said last mentioned passage,
   said means comprising a valve seat about said passage and a relatively flat valve disk mounted adjacent said valve seat, the said valve disk being chrome plated throughout.
3. The combination of claim 2 characterized by the fact that the valve disk is chrome plated on its entire surface and that the valve seat has a seating surface of hardened ferrous material.
4. The combination of claim 3 characterized by the fact that the valve seat is flat and that the raised portion of the said disk defines a seating surface lying within a single plane parallel to said valve seat.

5. In combination in a hydraulic valve lifter,
- a barrel and a plunger mounted therein for reciprocation,
- a pushrod receiving member in said plunger,
- a lubricant passage through the wall of said barrel and through the wall of said plunger and through said pushrod receiving member, and
- means for controlling the flow of fluid through said last mentioned passage,
- said means comprising a pair of cooperating valve means including a seat and a disc mounted adjacent said seat,
- one of said cooperating means being formed of hardened ferrous material and the other of said cooperating means being chrome plated.

References Cited
UNITED STATES PATENTS

| | | | |
|---|---|---|---|
| 2,797,701 | 7/1957 | Nurkiewicz | 251—368 X |
| 2,926,884 | 3/1960 | Clinkenbeard | 251—368 X |
| 3,225,752 | 12/1965 | Robinson | 123—119 |
| 3,354,898 | 11/1967 | Barnes | 137—480 X |
| 2,891,525 | 6/1959 | Moore | 123—90 |
| 2,932,290 | 4/1960 | Christensen | 123—90 |
| 3,090,367 | 5/1963 | Ayres | 123—90 |
| 3,291,107 | 12/1966 | Cornell | 123—90 |

AL LAWRENCE SMITH, *Primary Examiner.*

U.S. Cl. X.R.

137—513.5; 184—6; 251—368